(12) United States Patent
Engelhardt et al.

(10) Patent No.: US 6,392,794 B1
(45) Date of Patent: May 21, 2002

(54) LASER SCANNING MICROSCOPE

(75) Inventors: Johann Engelhardt, Bad Schönborn; Heinrich Ulrich, Heidelberg; William C. Hay, Heppenheim, all of (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 09/660,655

(22) Filed: Sep. 13, 2000

(30) Foreign Application Priority Data

Sep. 15, 1999 (DE) .......................................... 199 44 148

(51) Int. Cl.⁷ .............................................. G02B 21/00
(52) U.S. Cl. ...................................... 359/368; 359/372
(58) Field of Search ................................ 359/368, 372, 359/385, 389

(56) References Cited

U.S. PATENT DOCUMENTS

| | | | |
|---|---|---|---|
| 5,371,588 A | * 12/1994 | Davis et al. | 356/489 |
| 5,956,141 A | * 9/1999 | Hayashi | 356/496 |
| 5,959,735 A | * 9/1999 | Maris et al. | 356/381 |
| 6,151,127 A | * 11/2000 | Kempe | 356/484 |

FOREIGN PATENT DOCUMENTS

| | | |
|---|---|---|
| DE | 43 30 347 A1 | 3/1995 |
| DE | 199 06 757 A1 | 12/1999 |
| DE | 199 06 763 A1 | 8/2000 |

* cited by examiner

*Primary Examiner*—Mark A. Robinson
(74) *Attorney, Agent, or Firm*—Simpson, Simpson & Snyder, PLLC

(57) ABSTRACT

A laser scanning microscope, preferably a confocal laser scanning microscope, and a method for reference correction for a laser scanning microscope, in particular for a confocal laser scanning microscope, having an illumination beam path extending between a laser light source and a specimen, and a detection beam path extending between the specimen and a detection device, is characterized, for error correction with at least one reference beam path used for reference measurement, in that reference light can be coupled out of the illumination beam path into the reference beam path, and that the reference light is qualitatively and/or quantitatively detectable by a detection device.

32 Claims, 3 Drawing Sheets

LASER SCANNING MICROSCOPE

CROSS REFERENCE TO RELATED APPLICATIONS

This invention claims priority of a German filed patent application 199 44 148.0 which is incorporated by reference herein.

FIELD OF THE INVENTION

The invention concerns a laser scanning microscope, preferably a confocal laser scanning microscope, having an illumination beam path extending between a laser light source and a specimen, and a detection beam path extending between the specimen and a detection device.

BACKGROUND OF THE INVENTION

Laser scanning microscopes of the generic type have been known for some time and are used, among other applications, in the semiconductor industry for wafer inspection and in biomedical basic research. Reference is made, purely by way of example, to the German Patent Application DE-A-43 30 347. DE-A-43 30 347 discloses a generic laser scanning microscope which is suitable in particular for the biomedical application in which the specimen being examined is specifically labeled with various fluorescent dyes. After excitation with suitable laser light sources, the fluorescent light of the fluorescent dyes can be detected.

Laser scanning microscopes of the generic type have so far been used only to perform relative measurements. In this context, it is possible only for one specimen at a time to acquire fluorescent light from the fluorescent dye distribution present in the specimen and then, in the case where various fluorescent dyes are being detected, to correlate them quantitatively with one another with sufficient accuracy. When a further specimen is measured with the same laser scanning microscope, it would be desirable to correlate the measured image data of these two specimens with one another with corresponding accuracy. Quantitative comparative measurements on different specimens would be necessary principally for diagnostic applications in the medical field. This has heretofore not been possible because in laser scanning microscopes of the generic type, no apparatus for calibrating the relevant assemblies in the microscope is provided, and furthermore the individual assemblies of a laser scanning microscope are subject to short-term and long-term fluctuations due to external influences, which make comparative measurements of different specimens impossible even if the microscope assemblies are suitably calibrated with sufficient accuracy.

Sufficient calibration of the relevant assemblies of a laser scanning microscope is possible, for example, with the apparatus known from the German Patent Application DE-A-199 06 763, although the short-term and long-term fluctuations due to external influences cannot be compensated for therein. These influences include principally the temperature dependences of individual assemblies of the microscope, for example of the detector or the filters that are used, as well as laser intensity fluctuations (mode hopping).

SUMMARY OF THE INVENTION

It is therefore the object of the present invention to describe a laser scanning microscope, preferably a confocal laser scanning microscope, with which it is possible to perform absolute measurements on different specimens with sufficient accuracy, and in that context to correct for disruptive influences on the measurement conditions. Another object of the invention is to describe a method for achieving the aforesaid object.

The aforementioned object is achieved by a laser scanning microscope, preferably a confocal laser scanning microscope for inspecting a specimen, comprises a laser light source defining an illumination beam path extending between the laser light source and the specimen, a detection device a defining a detection beam path extending between the specimen and the detection device, at least one reference beam path for reference measurement wherein reference light is coupled out of the illumination beam path into the reference beam path, and the reference light is qualitatively and quantitatively detectable by the detection device.

Furthermore the above object is as well achieved by a method for reference correction in a laser scanning microscope, preferably a confocal laser scanning microscope having an illumination beam path extending between at least one laser light source and a specimen, and a detection beam path extending between the specimen and at least one detection device, comprises the steps of:

coupling reference light out of the illumination beam path (4) into a reference beam path (9);

using the reference light for error compensation; and detecting the reference light qualitatively and quantitatively with a detection device (6).

What has been recognized first of all according to the present invention is that with conventional laser scanning microscopes, comparative measurements of different specimens are not possible even when suitable calibration devices with an absolute accuracy are used, due to short-term and long-term fluctuations in individual assemblies of the laser scanning microscope. It has been recognized that above all intensity fluctuations in the laser (e.g. mode hopping), as well as changes in the temperature of the filters and of the detector, can negatively influence or falsify the comparative measurements of different specimens.

According to the present invention, therefore, the laser scanning microscope has a reference beam path with which it is possible to perform corresponding reference measurements. In this context, reference light is coupled out of the illumination beam path into the reference beam path and is detected by a detection device. As a result, in addition to the actual measurement of the specimen, reference measurements are performed with which the short-term and long-term fluctuations of the individual components of the laser scanning microscope can be compensated for.

The reference beam path extends between the coupling-out point and the detection device, the coupling-out point being provided in the illumination beam path of the laser scanning microscope. The laser light of the laser light source coupled into the reference beam path will hereinafter be called "reference light."

In terms of a concrete embodiment, the coupling-out point is located between the laser light source and the beam splitter device. This ensures that only light from the laser light source is coupled into the reference beam path, i.e., for example, no specimen fluorescent light components or conventional microscope transmitted light components are superimposed on the reference light.

If an acousto-optical beam splitter (AOBS) is used as the beam splitter device, it is advantageous if the coupling-out point is located directly at the AOBS. A laser scanning microscope having an AOBS is described in the German Patent Application DE-A-199 06 757.0.

Advantageously, further optical components are arranged in the reference beam path. These include a diffusion disk that comprises, for example, a glass plate with a roughened surface or a glass plate made of milk glass. Also arranged in the reference beam path is at least one beam deflection element, so that beam guidance of the reference beam can thereby be implemented.

In terms of a concrete embodiment, at least one light-sensitive sensor with which reference light can be detected is arranged in the reference beam path. This light-sensitive sensor is preferably provided only for a partial beam of the reference beam.

A beam attenuator (gray filter or neutral glass filter), with which the reference light intensity can be adapted to the properties of the detection unit, is arranged in the reference beam path. Advantageously, the transmissivity of the beam attenuator is selected such that the reference light intensity is of the same order of magnitude as the light intensity to be detected from the specimen, so that approximately the same dynamic range is present for detection of the reference light and the detected light.

A filter receiving element is also arranged in the reference beam path and acts on the illumination beam path and/or detection beam path. This can be a conventional filter wheel or a linearly arranged filter slider, into which or more different filters can be inserted. Coated glass plates that have wavelength-specific reflection or transmission characteristics are usually used as filter inserts. The use of colored glass plates or so-called holographic notch filters is also quite common. The filter receiving element is arranged movably, i.e. for example rotatably or displaceably in a linear direction. With the filter receiving element fitted with filter inserts, it is possible to select the beam to be detected using the detection device. Advantageously, for example, when the filter receiving element is in one position only light from the detection beam is selected for the detection device, when the filter receiving element is in another position only light from the reference beam is selected for the detection device, and when the filter receiving element is in a further position, no light is selected for the detection device in order to measure a dark current.

Since the filters used in the filter receiving element are in some cases temperature-dependent, and any temperature change results in a change in the transmission characteristic of the filters, the filter receiving element is kept at a constant temperature. For that purpose, the entire filter receiving element is heated with the aid of a suitably controlled heating system, in particular with a heating resistor.

In a preferred embodiment, the further optical elements in the reference beam path are arranged after the diffusion disk, as viewed outward from the coupling-out point. The coherent laser light coupled from the laser light source into the reference beam path is no longer coherent after passing through the diffusion disk, so that the interaction between the light passing through the diffusion disk and the further optical elements in the reference beam path does not cause any undesirable interference phenomena. Interference phenomena of this kind have an extremely disruptive effect on measurements, since even the slightest changes in temperature, or changes in path length thereby induced, in the optical beam path are associated with an intensity modulation of the light being measured.

Advantageously, a thick beam splitter, which can be configured as a plane-parallel glass plate, is used as the coupling-out element. In a preferred embodiment, this beam splitter is at least four millimeters thick and is arranged at a 45° angle to the illumination beam path, and at least one further light beam in addition to the reference beam is coupled out. The further light beam could be, for example, the secondary reflection at the beam splitter plate of the laser light coming from the laser light source. The "secondary reflection" is understood to be the first internal reflection occurring in the thick beam splitter plate at the glass surface facing away from the laser light source, which emerges in the direction of the reference beam path after passing through the glass surface of the beam splitter plate that faces toward the laser light source. What therefore results, as a function of the thickness of the beam splitter plate used, is a lateral parallel offset of the additionally coupled-out light beam with respect to the reference beam.

The intensity of the additionally coupled-out light beam is detected or measured with a light-sensitive sensor. The signal thus measured, which is directly proportional to the output power of the laser light source used, is used as the reference signal for the detection device. In a preferred embodiment, the reference signal thus obtained is used as the reference voltage for the digitization device. It is thus possible, advantageously and with simple means (only one corresponding photodiode), to correct the intensity fluctuation of the laser light source that negatively affects the specimen measurement. In particular, it is possible thereby to correct short-term intensity fluctuations of the laser light source (such as mode hopping), if that correction is, advantageously, performed during the recording of data from the specimen, i.e. the actual measurement operation.

With regard to the correction of, in particular, long-term fluctuations in the components built into the microscope, it is advantageous to correct the image data measured with the laser scanning microscope suitably using the reference signals measured with the reference beam. The result of this action is principally to counteract the long-term drift of the detection device or the laser light source. This drift causes an offset within the measured image data, which is precisely the reason why a quantitative comparison of measurements at different points in time cannot be made with the requisite absolute accuracy. Concretely, the correction of the measured image data in the digitization device could be accomplished with the aid of an input lookup table. This input lookup table (LUT) can be implemented in such a way that the intensities of the measured image data during the digitizing step are digitized in accordance with the measured reference signals of the reference beam in such a way that a further correction step for the image data digitized in that manner is no longer necessary. The advantage of this procedure is that the correction can be performed "online," i.e. already during image recording.

With regard to a further embodiment, at least one further light source, which for example can be used for purposes of calibrating the optical components present in the reference beam path, could be provided in the reference beam path. It is also conceivable for at least one further detector to be arranged in the reference beam path. For example, the light intensity in the reference beam path upstream from an optical element of the reference beam path could be measured with an additional detector, and the intensity downstream from that optical element could be measured with an additional detector, so as thereby to be able to eliminate or compensate for possible interference effects on that optical element.

In order to compensate for the temperature dependence of the optical elements that are arranged in the illumination beam path and/or detection beam path but not in the reference beam path, those elements could be kept at a constant temperature. This could again be accomplished, as in the case of the filter receiving element, with a controlled heating system.

Short-term and long-term fluctuations of the individual components of the laser scanning microscope can thereby advantageously be compensated for; in particular, by way of the reference measurement occurring simultaneously with the specimen measurement it is possible to compensate for short-term fluctuations of the components.

With regard to compensation for long-term fluctuations of the assemblies present in the laser scanning microscope, provision is advantageously made for measuring, directly before and/or after each measurement cycle, reference signals with which the measured specimen image data can be corrected. Quantitative values such as the instantaneous laser light output of the light source used, or the dark current of the detection device, may be of particular interest in this context. A measurement cycle could comprise a one-, two-, or three-dimensional data recording.

For the reference correction, at least the measured variables listed below are measured, specifically the dark current $I_0$, reference R, and dark current $R_0$ of the reference.

The measured image data $I_{XYZ}$ are corrected in suitable fashion using the measured reference signals, preferably according to the equation:

$$I_{XYZ,KORR} = F*(I_{XYZ}-I_0)/(R-R_0),$$

in which what is used for the variable F is a suitable scaling factor that ultimately maps the measured image data, during correction, onto a suitable digitization region, for example onto the 12-bit region comprising the gray values from 0 to 4095.

To simplify the reference correction, $I_0=R_0$ could be set, specifically if, on the basis of the measurements made with the reference correction that is actually used, there is little difference in value between the dark current $R_0$ of the reference and the dark current $I_0$ of the system when the light source is blanked out.

BRIEF DESCRIPTION OF THE DRAWINGS

There are various ways of advantageously embodying and developing the teaching of the present invention. Reference is made, for that purpose, on the one hand to the claims, and on the other hand to the explanation below of two exemplary embodiments of the invention with reference to the drawings. In conjunction with the explanation of the preferred exemplary embodiments of the invention with reference to the drawings, a general explanation is also given of preferred embodiments and developments of the teaching. In the drawings:

DETAILED DESCRIPTION OF THE INVENTION

Figure 1:
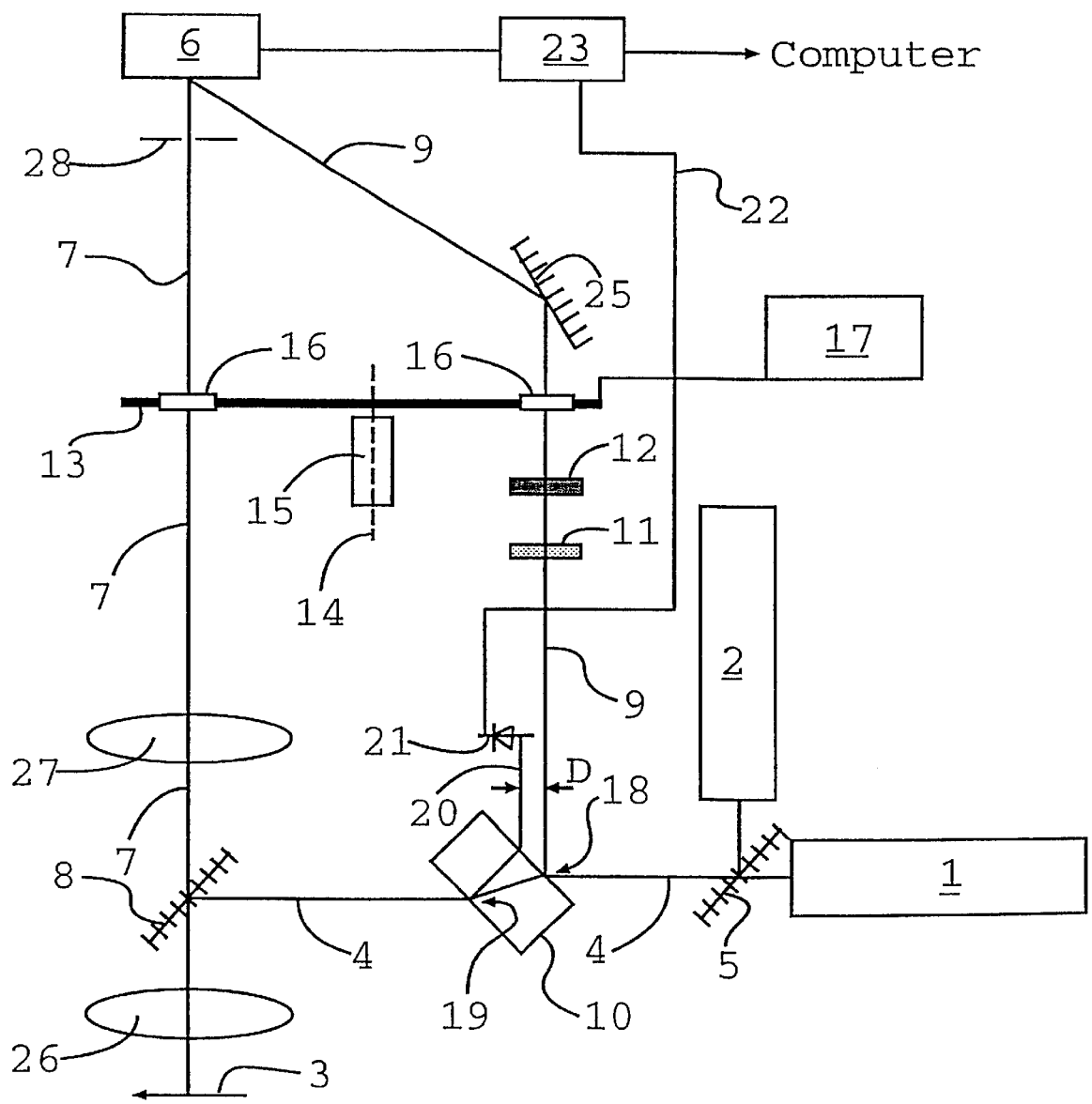
FIG. 1 shows, in a schematic depiction, an exemplary embodiment of a laser scanning microscope according to the present invention, the components of the laser scanning microscope being depicted therein merely in simplified fashion.

The schematic depiction of FIG. 1 shows a confocal laser scanning microscope that has an illumination beam path 4 extending between the two laser light sources 1, 2 and specimen 3. The two beams of lasers 1 and 2 are combined by way of beam combiner 5. Detection beam path 7 extends between specimen 3 and detection device 6; between beam splitter 8 and specimen 3, illumination beam path 4 is identical to detection beam path 7.

According to the present invention, the confocal laser scanning microscope has a reference beam path 9 into which reference light of illumination beam path 4 is coupled, the reference light being qualitatively and quantitatively detected by detection device 6. Light of illumination beam path 4 is coupled into reference beam path 9 at coupling-out point 10 or 18, coupling-out point 10 being in this case arranged between beam combiner 5 and beam splitter 8.

According to the present invention, further optical components are arranged in reference beam path. The purpose of diffusion disk 11 is to make the coherent reference light coming out of the illumination beam path incoherent, and moreover to adapt its intensity to the intensity of the detected light of specimen 3 that is to be detected. Another purpose of diffusion disk 11 is to make the reference light for detection device 6 position-insensitive, i.e. to expand somewhat the reference light beam that has a point-like cross section, so that almost the same detection conditions are present as with fluorescent light detection. Arranged further along is a beam attenuator 12 in the form of a neutral glass filter, which is additionally used to adapt the light intensities in detection beam path 7 to the light intensities in reference beam path 9, and is dimensioned appropriately in terms of the degree of transmission.

In the exemplary embodiment of a microscope according to the present invention shown in FIG. 1, a filter receiving element 13 that acts on reference beam path 9 and detection beam path 7 is provided. Filter receiving element 13 is arranged rotatably about axis 14, and is moved by motor 15 into the desired position.

Figure 3:
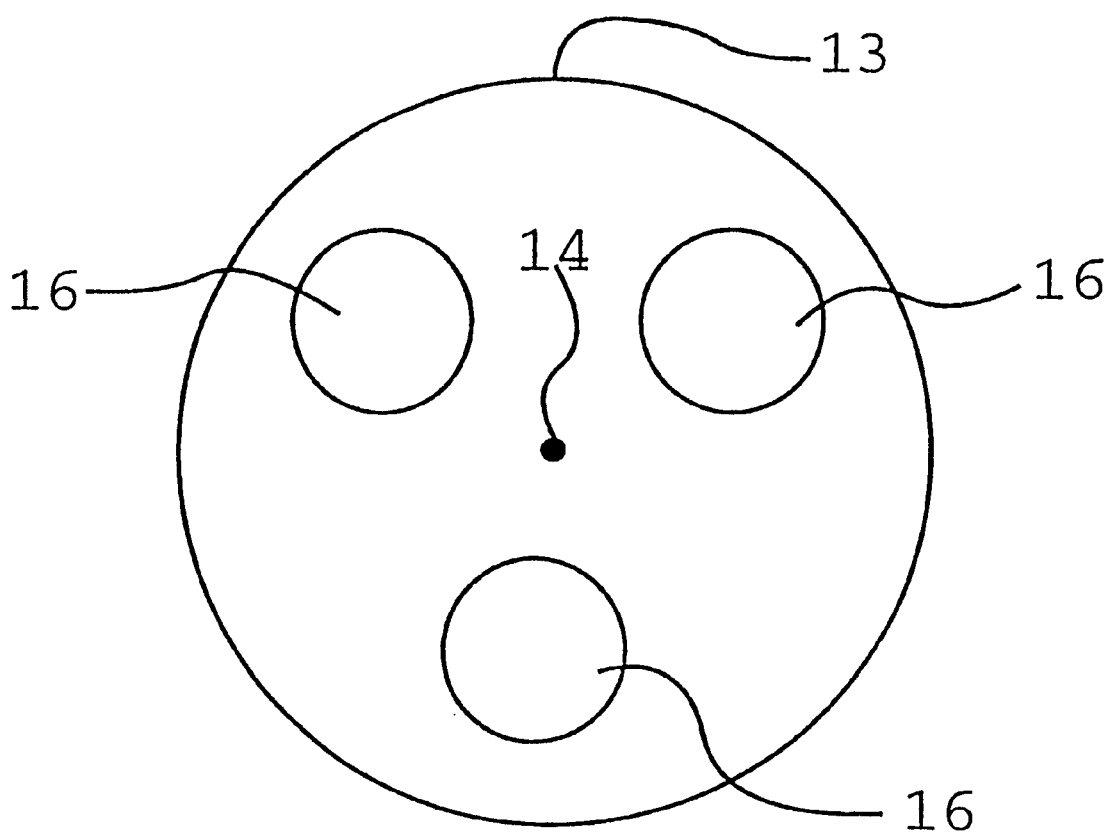
FIG. 3 shows a filter receiving element in a schematic depiction.

As shown in FIG. 3, filter receiving element 13 has three receiving mounts for filter inserts 16. The blocking filter for laser light source 1 is inserted in the one receiving mount, and the blocking filter for laser 2 is inserted in the next receiving mount; the third receiving mount remains empty. The term "blocking filter" in this context is understood to mean that light of all wavelengths except the excitation wavelength of the corresponding laser light source can pass through the blocking filter.

Four working positions are provided for the rotatably arranged filter receiving element. In the first, the receiving mount of the blocking filter for laser 1 is positioned so that only the light of detection beam 7 is released toward detection device 6. In the second working position, filter receiving element 13 is positioned so that the receiving mount having the blocking filter of laser 2 is positioned in detection beam 7, so as once again to release only the light of detection beam 7 to detection device 6. With filter receiving element 13 in the third working position, the receiving mount that was left empty is positioned in reference beam path 9, so that only reference light of reference beam 9 can pass through to detection device 6. A fourth operating position of filter receiving element 13 is provided such that neither light of detection beam 7 nor light of reference beam 9 reaches detection device 6.

Since no provision is made, in this concretely described embodiment according to the present invention, for the individual filter inserts 16 inserted in filter receiving element 13 to be quantitatively measured with reference beam 9, in order to prevent external temperature influences on filter inserts 16 the entire filter receiving element 13 is kept at a constant temperature using a temperature control system 17 and a heating resistor (not depicted).

According to the present invention, beam attenuator 12 arranged in reference beam path 9, and filter inserts 16 that can be swung into reference beam path 9, are arranged downstream from diffusion disk 11 (as viewed from coupling-out point 10). Since the reference light coupled by coupling-out point 10 into reference beam 9 is no longer coherent after passing through diffusion disk 11, disruptive interference phenomena are avoided at elements 12, 16 in reference beam path 9 downstream from diffusion disk 11.

The coupling-out element arranged in illumination beam path 4 is a thick beam splitter that is embodied as a thick plane-parallel glass plate. It is arranged at a 45° angle relative to illumination beam path 4, and has no particular wavelength-specific reflection or transmission properties. The thickness of the beam splitter plate is 10 millimeters. The reference light intensity coupled into reference beam path 9 depends principally on the refractive index of the beam splitter plate (Fresnel formula). The main reflection of the illumination light at the glass surface of beam splitter plate 18 facing toward lasers 1, 2 is thus used as the reference light for reference beam path 9.

At the glass surface of beam splitter plate 10 facing away from the light sources, there occurs in beam splitter plate 10 a secondary reflection 19 that, after it has emerged at the glass surface of beam splitter plate 10 facing toward lasers 1, 2, extends in the direction of reference beam path 9 at a lateral offset therefrom. Lateral beam offset D can thus be adjusted as a function of the thickness of beam splitter plate 10. In addition, because of lateral beam offset D, it is impossible for reference light beam 9 (main reference) to become superimposed on light beam 20 (secondary reflection) that is also coupled out. This also eliminates any interference phenomena between these two light beams coupled out of illumination beam path 4 which would disadvantageously influence the measurement results of the laser scanning microscope and of reference beam path 9.

Light beam 20 additionally coupled out as a result of secondary reflection 19 is detected with a light-sensitive sensor 21 whose signal output is connected via a line 22 directly to digitization device 23. The light intensities of beams 7, 9 measured with detection device 6 are digitized by digitization device 23 and conveyed to a computer. It is thereby possible to have available, throughout measurement of the two beams 7, 9, a continuously present reference signal with which, principally, the short-term fluctuations of lasers 1, 2 can be corrected. According to the present invention, the reference signal of light-sensitive sensor 21 is used as the reference voltage for digitization device 23.

According to the present invention, the measured image data are suitably corrected with the aid of the reference signals measured from reference beam 9. For this purpose, provision is advantageously made for correction of the measured image data to be performed with an input lookup table in digitization device 23. Any drift of an assembly brought about as a result of long-term fluctuations is thus, with the aid of the reference measurement, given a corresponding digitization offset during digitization. Thus no further electronic components, or calculation steps to be performed with the computer, are needed.

The method for reference correction with the confocal laser scanning microscope present here in accordance with the present invention is characterized in that the reference light from illumination beam path 4 used for error compensation is coupled into reference beam path 9 and is qualitatively and/or quantitatively detected by a detection device 6. In this context, reference signals with which measured specimen image data can be suitably corrected are measured before and/or after each measurement cycle. In this exemplary embodiment, a measurement cycle is defined by a two-dimensional data recording; i.e. a reference measurement with reference beam 9 is performed at the beginning of and after the recording of each image plane.

For example, before and after a measurement cycle, and after filter receiving element 13 has been appropriately positioned, first a measurement is made of reference signal R of active laser 1 or 2 that was used previously for two-dimensional data recording of the specimen. When filter receiving element 13 has been repositioned, the dark current ITO of the system is measured; this involves blanking out the light from detection beam 7 and reference beam 9.

According to the present invention, the measured image data $I_{XYZ}$ are corrected using the two measured reference values R and $I_0$, according to the equation:

$$I_{XYZ,KORR}=F^*(I_{XYZ}-I_0)/(R-I_0),$$

F having been selected so that in accordance with the dynamic range of the measured image data, a 24-bit gray value range, corresponding to gray values from 0 to 16,777,215, is present after digitization with digitization device 23. This correction is advantageously performed with the aid of an input lookup table.

Figure 2:
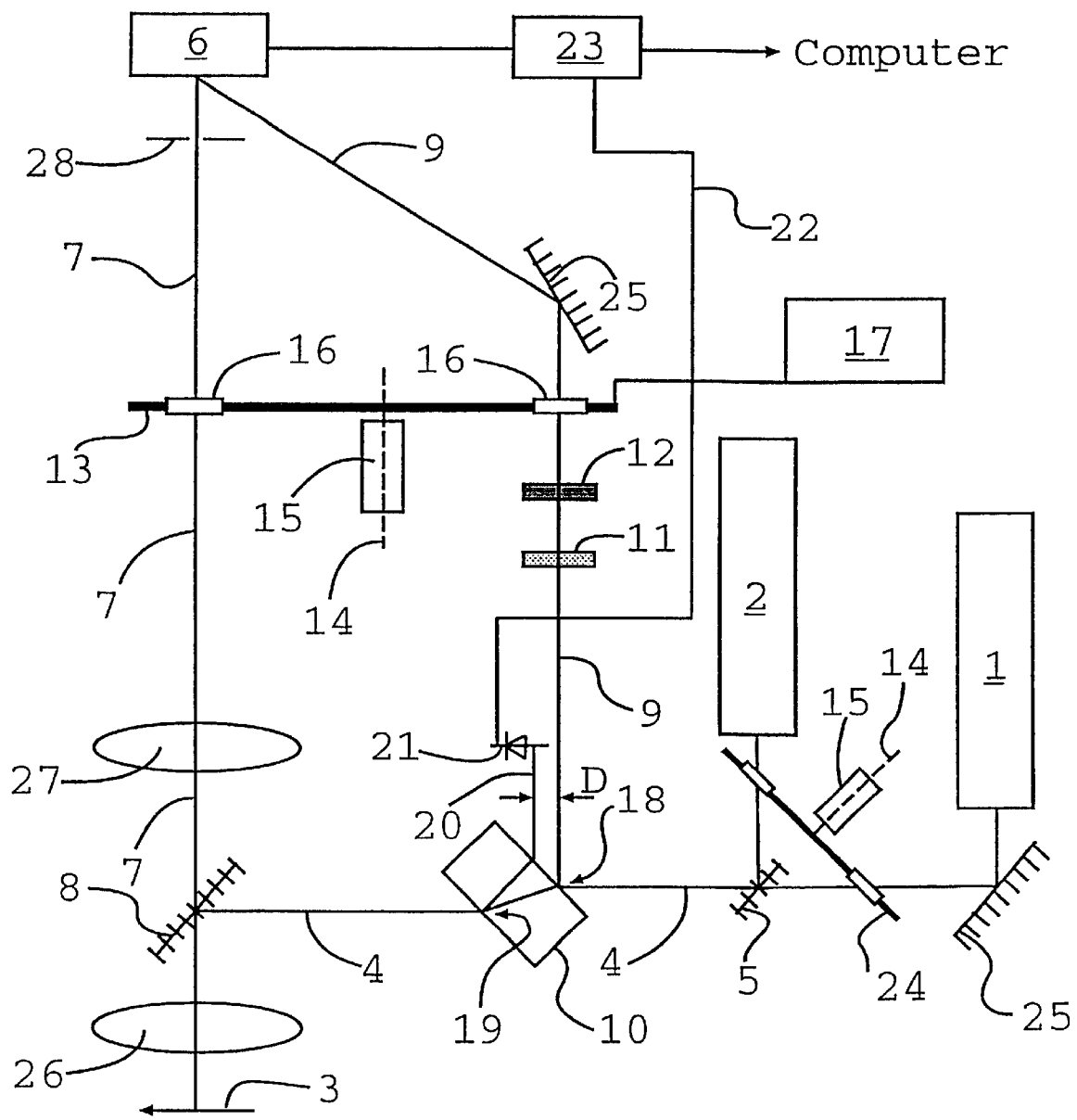
FIG. 2 shows, in a schematic depiction, the laser scanning microscope of FIG. 1 in which an alternative illumination apparatus is provided.

The exemplary embodiment as shown in FIG. 2 differs from the exemplary embodiment of FIG. 1 in that an additional, rotatably arranged filter receiving element 24 is provided for selection of the two lasers 1 and 2. With this filter receiving element 24 it is possible to select light either from laser 1 or from laser 2, or from neither of the two lasers 1, 2.

In conclusion, be it noted very particularly that the exemplary embodiments set forth above serve merely to describe the teaching claimed, but do not limit it to the exemplary embodiments selected in purely random fashion.

PARTS LIST

1 Laser
2 Laser
3 Specimen
4 Illumination beam path
5 Beam combiner
6 Detection device
7 Detection beam path
8 Beam splitter
9 Reference beam path
10 Coupling-out point, coupling-out element
11 Diffusion disk
12 Beam attenuator
13 Filter receiving element
14 Rotation axis of (13)
15 Motor
16 Filter inserts
17 Temperature control system
18 Main reflection
19 Secondary reflection
20 (Additionally coupled-out) light beam
21 (Light-sensitive) sensor
22 Line
23 Digitization device
24 Filter receiving element
25 Beam deflection element
26 Objective
27 Tubelens
28 Detection aperture
D Lateral beam offset

What is claimed is:

1. A laser scanning microscope for inspecting a specimen (3), said microscope comprising a laser light source (1, 2)

defining an illumination beam path (4) extending between the laser light source (1, 2) and the specimen (3), a detection device (6) defining a detection beam path (7) extending between the specimen (3) and the detection device (6), at least one reference beam path (9) for reference measurement wherein reference light is coupled out of the illumination beam path (4) into the reference beam path (9) and the reference light is qualitatively and quantitatively detectable by the detection device (6), and a filter receiving element (13), wherein with the filter receiving element (13) either no light, or light from the detection beam path (7), or light from the reference beam path (9) can be selected through to the detection device (6).

2. The laser scanning microscope as defined in claim 1, wherein the reference beam path (9) comprises a coupling-out element (10) and the reference beam path (9) extends between the coupling-out element (10) and the detection device (6).

3. The laser scanning microscope as defined in claim 2, wherein the coupling-out element (10) is provided in the illumination beam path (4).

4. The laser scanning microscope as defined in claim 3, wherein the coupling-out element (10) is provided between the laser light source (1, 2) and a beam splitter device (8).

5. The laser scanning microscope as defined in claim 4, wherein an AOBS acts as the beam splitter device (8).

6. The laser scanning microscope as defined in claim 2, wherein a thick beam splitter is used as the coupling-out element (10).

7. The laser scanning microscope as defined in claim 6, wherein the beam splitter serving as the coupling-out element (10) is at least four millimeters thick.

8. The laser scanning microscope as defined in claim 6, wherein at least one further light beam (20) in addition to the reference beam (9) is coupled out at the coupling-out element (10).

9. The laser scanning microscope as defined in claim 8, wherein the intensity of the additionally coupled-out light beam (20) is detected with a light-sensitive sensor (21).

10. The laser scanning microscope as defined in claim 9, wherein at least one signal of the light-sensitive sensor (21) is used as a reference signal for the detection device (6) which is connected to a digitization device (23).

11. The laser scanning microscope as defined in claim 10, wherein the reference signal is used as the reference voltage for the digitization device (23).

12. The laser scanning microscope as defined in claim 1, wherein further optical components are arranged in the reference beam path (9).

13. The laser scanning microscope as defined in claim 12, wherein the further optical components consist essentially of a diffusion disk (11), at least one beam deflection element (25), at least one light-sensitive sensor and at least one beam attenuator (12) arranged in the reference beam path (9).

14. The laser scanning microscope as defined in claim 13, wherein the further optical elements of the reference beam path (9) are arranged after the diffusion disk (11), as viewed outward from the coupling-out element (10).

15. The laser scanning microscope as defined in claim 1, wherein the filter receiving element (13) has at least one filter insert (16) and is arranged movably.

16. The laser scanning microscope as defined in claim 1, wherein the filter receiving element (13) is kept at a constant temperature, in order to prevent disturbances due to the temperature dependence of the filters (16) used in the filter receiving element (13).

17. The laser scanning microscope as defined in claim 16, wherein the filter receiving element (13) is kept at a constant temperature by way of a controlled heating system (17), in particular a heating resistor.

18. The laser scanning microscope as defined in claim 1, wherein measured image data measured with the laser scanning microscope are corrected using reference signals measured with the reference beam (9).

19. The laser scanning microscope as defined in claim 18, wherein the correction of the measured image data in a digitization device (23) is accomplished with the aid of an input lookup table.

20. The laser scanning microscope as defined in claim 1, wherein at least one further light source is provided for the reference beam path (9).

21. The laser scanning microscope as defined in claim 1, wherein at least one further detector is provided for detection of the light in the reference beam path (9).

22. A method for reference correction in a laser scanning microscope, said microscope having an illumination beam path (4) extending between at least one laser light source (1, 2) and a specimen (3), and a detection beam path (7) extending between the specimen (3) and at least one detection device (6), comprising the steps of:

coupling reference light out of the illumination beam path (4) into a reference beam path (9);

using the reference light for error compensation;

applying a filter receiving element (13), wherein with the filter receiving element (13) either no light, or light from the detection beam path (7), or light from the reference beam path (9) can be selected through to the detection device (6); and detecting the reference light qualitatively and quantitatively with a detection device (6).

23. The method for reference correction as defined in claim 22, wherein reference signals with which measured specimen image data are corrected are measured before or after each measurement cycle.

24. The method for reference correction as defined in claim 23, wherein a measurement cycle comprises a one-dimensional data recording.

25. The method for reference correction as defined in claim 23, wherein a measurement cycle consists essentially of a two-dimensional and a three-dimensional data recording.

26. The method for reference correction as defined in claim 22 comprises the step of: measuring a dark current $I_0$ of the system with the light source blanked out as a reference signal.

27. The method for reference correction as defined in claim 22, comprises the step of: measuring a reference R as a reference signal.

28. The method for reference correction as defined in claim 22, comprises the step of: measuring a dark current $R_0$ of the reference as a reference signal.

29. The method for reference correction as defined in claim 22, comprises the step of:

providing corrected image data $I_{XYZ,KORR}$ using measured image data $I_{XYZ}$, according to the equation:

$$I_{XYZ,KORR} = F^*(I_{XYZ}-I_0)/(R-R_0),$$

F being a scaling factor.

30. The method for reference correction as defined in claim 29, wherein $I_0 = R_0$ is set.

31. The method for reference correction as defined in claim 22, wherein reference signals with which the measured specimen image data is corrected are measured before and after each measurement cycle.

32. A confocal laser scanning microscope for inspecting a specimen (3), comprises a laser light source (1, 2) defining an illumination beam path (4) extending between the laser light source (1, 2) and the specimen (3), a detection device (6) a defining a detection beam path (7) extending between the specimen (3) and the detection device (6), at least one reference beam path (9) for reference measurement wherein reference light is coupled out of the illumination beam path (4) into the reference beam path (9) and the reference light is qualitatively and quantitatively detectable by the detection device (6), and a filter receiving element (13), wherein with the filter receiving element (13) either no light, or light from the detection beam path (7), or light from the reference beam path (9) can be selected through to the detection device (6).

* * * * *